(12) United States Patent
Labala

(10) Patent No.: US 7,644,572 B2
(45) Date of Patent: Jan. 12, 2010

(54) COMPACT LIGHTWEIGHT TURBINE

(75) Inventor: Gustavo Francisco Labala, Buenos Aires (AR)

(73) Assignee: Mandolin Financial Properties Inc., Tortola (VG)

( * ) Notice: Subject to any disclaimer, the term of this patent is extended or adjusted under 35 U.S.C. 154(b) by 222 days.

(21) Appl. No.: 11/404,265

(22) Filed: Apr. 13, 2006

(65) Prior Publication Data

US 2006/0207254 A1 Sep. 21, 2006

Related U.S. Application Data

(63) Continuation-in-part of application No. 10/827,943, filed on Apr. 20, 2004, now Pat. No. 7,065,954.

(51) Int. Cl.
*F02C 1/06* (2006.01)
*F02C 3/10* (2006.01)
*F02C 6/00* (2006.01)
*F02G 1/00* (2006.01)
*F02G 3/00* (2006.01)
*F02G 1/057* (2006.01)
*F01M 1/00* (2006.01)
*F04D 27/00* (2006.01)
*F04D 29/08* (2006.01)
*F16H 3/08* (2006.01)

(52) U.S. Cl. .................. 60/39.163; 60/39.512; 60/791; 60/788; 184/6.12; 184/6.11; 184/6.26; 184/11.2; 415/16; 415/112; 74/370

(58) Field of Classification Search .............. 60/39.163, 60/39.512, 733, 804, 791, 788; 184/6.12, 184/6.11, 6.26, 11.2; 415/16, 112; 74/370
See application file for complete search history.

(56) References Cited

U.S. PATENT DOCUMENTS

| 2,313,205 | A | * | 3/1943 | Potez | 74/370 |
|---|---|---|---|---|---|
| 2,973,894 | A | * | 3/1961 | Kimball et al. | 60/788 |
| 3,009,319 | A | * | 11/1961 | Filipenco | 60/770 |
| 3,116,908 | A | * | 1/1964 | Wosika | 60/791 |
| 3,552,804 | A | * | 1/1971 | Bracken, Jr. | 384/99 |

(Continued)

FOREIGN PATENT DOCUMENTS

JP 2000074081 A * 3/2000

(Continued)

*Primary Examiner*—Thai Ba Trieu
(74) *Attorney, Agent, or Firm*—Notaro & Michalos P.C.

(57) ABSTRACT

A turbine combustion chamber is provided with deflectors on the cold side generating vortices in a secondary gas flow into the chamber, thereby confining the flame front under variable operating conditions and cooling the chamber walls. The high-speed cantilever shaft has a longitudinal duct and an array of fine orifices in the wall of the shaft for directing pressurized oil jets that impinge on the shaft bearings with little relative speed to increasing wetting of the bearing components. Oil is supplied to the duct by means of a positive-displacement pump directly driven by the output shaft. The pump output pressure is monitored to signal the end of the start-up sequence when the turbine reaches sufficient speed. The turbo-engine further includes devices for decoupling vibrations between the three systems thereof, including a loosely-mounted removable spline pivotable at both ends for coupling the high-speed shaft to the step-down gearbox.

18 Claims, 8 Drawing Sheets

U.S. PATENT DOCUMENTS

| | | | |
|---|---|---|---|
| 3,943,703 A * | 3/1976 | Kronogard | 60/791 |
| 4,116,611 A * | 9/1978 | Syska | 431/353 |
| 4,177,638 A * | 12/1979 | Wood | 60/39.512 |
| 4,211,070 A | 7/1980 | Portmann | 60/39.08 |
| 4,714,139 A * | 12/1987 | Lorenz et al. | 184/6.11 |
| 4,755,103 A * | 7/1988 | Streifinger | 415/111 |
| 4,987,795 A * | 1/1991 | Nguyen | 74/606 R |
| 5,119,905 A * | 6/1992 | Murray | 184/6.11 |
| 5,716,423 A * | 2/1998 | Krul et al. | 55/485 |
| 6,033,450 A * | 3/2000 | Krul et al. | 96/190 |
| 6,098,753 A * | 8/2000 | Lamarre et al. | 184/6.11 |
| 6,398,833 B1 * | 6/2002 | Santerre et al. | 96/189 |
| 6,580,189 B2 | 6/2003 | Mooney | 310/81 |
| 6,871,488 B2 | 3/2005 | Oskooei et al. | 60/39.465 |
| 7,124,857 B2 * | 10/2006 | Gekht et al. | 184/11.2 |
| 2007/0294986 A1 * | 12/2007 | Beetz et al. | 55/385.3 |

FOREIGN PATENT DOCUMENTS

| | | |
|---|---|---|
| JP | 2004324863 A * | 11/2004 |
| SU | 1745294 A1 * | 7/1992 |

* cited by examiner

COMPACT LIGHTWEIGHT TURBINE

CROSS-REFERENCE TO RELATED APPLICATION

The present application is a continuation-in-part of my U.S. application Ser. No. 10/827,943 filed on Apr. 20, 2004 now U.S. Pat. No. 7,065,954.

FIELD OF THE INVENTION

The present invention is related to a compact, lightweight, efficient and durable turbo-engine able to deliver power to a shaft as well as thrust from the reaction of the exhaust gases and heat. One practical application of the present turbo-engine is for generating electricity. Another application is for propeller-driven aircrafts whether airplanes or helicopters, in marine uses for driving an underwater propeller, or any other application requiring delivery of power to a rotary shaft, whereby the balance of energy of the exhaust gases may be used for cogeneration or directly as heat.

BACKGROUND OF THE INVENTION

To be cost efficient, terrestrial electrical generators under 1,000 HP use reciprocating engines as their power source. Reciprocating engines use up a lot of closed space which has to be adapted to tolerate heavy weights and medium- and low-frequency vibrations, high maintenance costs and a narrow range of fuels. Furthermore, these engines take a long time to warm up and get into condition for connecting to the power lines, which hinders their availability to swiftly respond to demand or else causes high maintenance costs when it is stopped for servicing to be carried out while still hot to reduce the outage time.

Light airplanes and helicopters needing power plants under 500 HP use internal-combustion engines. Compared to turbo-engines, these engines are heavier per unit of delivered power, highly complex because of the large quantity of moving parts they contain and require periodic specialized inspections.

Light one-to-four seating helicopters are particularly penalized because there is no alternative for them other than combustion engines. Therefore, their capabilities are severely restricted by the need to carry a heavy power plant, a significant weight compared to one or more passengers. Stresses and vibrations transmitted to the whole helicopter and to the passengers or the use of reciprocating engines further significant deter use of these helicopters.

The high market prices of both light airplanes and helicopters have made room for the use of turbines instead of combustion engines. A difference compared to combustion engines, wherein the different strokes of the ignition cycle are carried out reciprocating in cylinders (in pulses), is that turbines carry out their ignition-compression process continuously. Turbines comprise a compression stage for producing pressurized air, a combustion chamber into which the pressurized air is admitted together with fuel and an expansion stage producing power on a rotary shaft by means of a turbine integrated to the compressor. Part of the power generated by the turbine is used for driving the compressor and auxiliary systems (e.g. alternators, pumps, etc.), the balance is available as net power.

A favorable feature of turbines is their ability to generate a high density of mechanical energy per volume-unit compared to combustion engines of like power. On the other hand, an unfavorable feature is that turbo-engines lack massive oscillating or eccentric mechanisms, hence dynamic high-amplitude and low-frequency stresses are transmitted to the structure thereof.

A further competitive advantage of turbo-engines vis-a-vis combustion engines is the former's greater flexibility in the election of fuel. Combustion engines may only use aircraft petrol which is very volatile and explosive, leading therefore to safety concerns. On the other hand, turbo-engines may be fuelled with aircraft kerosene (JP1), which is much less volatile and explosive, natural gas, diesel-oil or practically any kind of fossil or synthetic fuel producing less emission of polluting gases compared to combustion engines of like power. The possibility of using cheap fuel makes turbo-engines moreover more attractive for terrestrial or stationary uses for generation of electricity or delivering work to a shaft.

In addition, the balance of heat which is emitted as well as the high-temperature exhaust gases may be advantageously used, either for supplying a heating system or for recovery in a secondary cycle, leading to improved efficiency of the turbo-engine cycle. Furthermore, turbo-engines are less sensitive than combustion engines to loss of atmospheric pressure and low temperatures, as occurring at high flight altitudes. Aircraft turbines are firmly established in the high power segment, say above 600 HP.

An important technical obstacle that must be overcome when designing a low-power turbo-engine turning at high speeds (over 25,000 RPM, typically up to 60,000 or 70,000 RPM) is that its applications generally require a substantially lower number of revolutions per minute (RPM), meaning that an associated gear-box is necessary but which otherwise would be undesirable in that it adds weight, mechanical complexity and auxiliary systems.

BRIEF REVIEW OF THE PRIOR ART

FIG. 1 is a schematic of a compact turbo-engine disclosed in my Argentine patent publication AR 31,898 A1 (application serial number P010105645), published on 8 Oct. 2003, showing an annular combustion chamber and the path followed by gases inside there. FIG. 2 is a schematic side-section view of the high-speed output shaft system illustrating in detail a part of the system for lubricating the bearings of the main cantilever shaft of FIG. 1 and the path the oil follows therein. As schematically shown in FIGS. 1 and 2, my AR patent publication 31,898 A1 discloses a compact turbo-engine comprising an air compression stage 1, an annular combustion chamber 2 including a cold peripheral region 3, a hot central region 4 and a fuel counter-flow injection system comprising redundant electrically-operated nozzles 6 for injecting fuel into the combustion chamber 2 against the gas (air) flow direction. Igniter plugs 10 are located in the hot region 4 for igniting the fuel and gas mixture, generating a flame front which expands towards the cold region 3. Flame conduction is by means of air jets 5 between the cold and hot regions 3-4.

The turbine further includes a rotor 7 for exducing work and expansion, a high-speed cantilever shaft 8 with which the compression and expansion stages are integrated, supported by a pair of bearings 9 located in the "cold" side, lubricated by means of oil distributed through the hollow inside of the shaft 8 and orifices 27 in its wall. The work-output shaft speed shift-down system is coupled to this end by means of a gear 11. This gear 11 is integrated to a hollow spline 12 housed within a cavity inside the high-speed shaft 8 and coupled thereto by means of fluting 13. Oil is fed back to a reservoir by means of an outer jacket 14 that surrounds and retains the bearings 9 and the use of a blower 15. The lubrication of the gear turning at high speeds is carried out through orifices in the base of the gear cogs, centrifugal force driving the oil out from the central cavity of the gear.

One of the greater technical problems in designing an efficient, low-power turbine is that, due to physical operational principles, a reduction in the flow capacity and size thereof leads to having to increase the rotation speed of the compressor-turbine assembly, thereby significantly increasing mechanical stress on the moving parts materials. This conditions the life-term of the components and is in part associated with the wear of the moving parts.

The main causes of wear tend to be inadequate lubrication of the bearings turning at high speed, gear alignment tolerances and imbalance, stress resulting from thermal expansion of materials and transmission of vibrations between the high-speed shaft, the step-down gears and the output shaft delivering useful work, be it in electrical generators, propellers, water pumps, compressors et cetera.

Lubrication is critical for achieving high turning speeds on ball- or roller-bearings, fundamentally because of the impossibility of injecting the lubricant. Relatively simple air or gas bearings may be reliably used in very low power applications (tens of HP). The usefulness of this solution is nearly exclusively limited to lightweight shafts turning at very high speeds. These weight and speed limitations restrict the power range. Magnetic bearings are extremely expensive and complex and, hence, not cost-effective in turbo machines of powers under 1,000 HP.

In order to achieve a low-maintenance turbine, the problems leading to wear in the moving parts need to be addressed since they shorten the useful lifespan of the mechanical parts and increase the frequency of having to change the oil and filters.

Friction between the moving parts of the bearings leads to less efficiency since mechanical energy is converted into heat, ultimately raising the oil temperature. This poses an additional requirement of having to provide means (i.e. radiators) for removing heat and distribution ducts for the oil systems, thereby increasing the quantity of components and complexity, in detriment of overall weight and compactness.

Devices exist for directing the injection of oil into the cavities of the bearings by means of high-speed jets. However, they are scarcely efficient at wetting the raceways due to the impact and dispersion of the oil jets against the balls moving at high speed, as a result of the significant difference in speed between the jets and the balls. Although this system lessens the impact of the abovementioned effects, it falls short in overcoming the drawbacks conditioning the useful lifespan of the bearings.

U.S. Pat. No. 6,580,189 (to Mooney) discloses a vibratory screening machine having a hollow output shaft through which liquid lubricant is conducted via radial bores in the shaft to bathe the roller bearings supporting the shaft. Vibratory motors turn at relatively low speeds (typically between 750 and 3,000 RPM) such that the lubricant is not really injected but rather travels (see column 4, line 49) along the conduit wall under the effects of gravity and centrifugal forces.

The Mooney lubrication system is unsuitable at the high speeds found in a compact turbo-engine. At speeds approaching 60,000 RPM, the lubricant, instead of flowing into the bearings, would form a spray of droplets traveling at about 60 m/s, literally colliding the bearing rollers. At such speeds, the force with which the droplets collide is about 40,000 times their weight such that they would disperse without wetting the rollers properly. In addition, if one were to bathe the bearings in oil, at such speeds the viscosity of the oil would cause significant friction on the rollers, thereby generating heat which would have to be removed somehow and producing a braking effect would translate into an unacceptable loss of turbine power and efficiency.

The need for a big reduction in the speed of turbines of powers under 600 HP for applications such as low-speed turbo-shafts implies the addition of a gearbox. Alignment and tolerances between the step-down gears and the transmission of vibrations from the low-speed shaft back to the high-speed shaft condition the durability of its components, in particular the bearings.

It is also necessary to be able to easily assemble and remove said devices and that they enjoy a sufficient play to accommodate thermal expansion.

The step-down gearbox and the turbine high-speed shaft 8 in my abovementioned AR patent publication AR 31,898 A1 are coupled by means of a hollow spline 12 affixed to a gear 11. The high-speed gear must be mounted in the shift-down gear maintaining very strict tolerances on special benches to guarantee proper alignment and a certain overall useful lifespan. Maintenance work must therefore be carried out in specific installations to which the turbo-engine has to be taken.

Some current designs use an orbital-type gear as the shift-down gear, comprising an axially arranged shaft and three gears. One of the main drawbacks of this arrangement is the transmission of vibrations towards the high-speed shaft, which is detrimental to the useful lifespan of the bearings and is exacerbated by the interaction of more than one torque transmission point.

U.S. Pat. No. 4,177,638 (to Wood) discloses a turbo-engine including a flexible spline joint coupling the turbine to a gearbox to decouple vibrations from the transmission and compensate thermal expansion. A significant drawback of the Woods design is that the high-speed gear wheel is integrated into the spline member such that any eccentricity or misalignment between mounted parts causes undesirable effects such as stress on the shaft leading to possible fatigue therein, early wear on engagement areas and reduces the useful lifespan of the bearings. Therefore, the different parts have to be positioned precisely so as to be properly aligned and joined together using specific centering means for rotational movement, requiring well-trained personnel and is expensive and time-consuming.

JP patent 2000-074,081 (to Koyo Mach) discloses a spline for high-torque and low-speed applications wherein the orientation of a rotary shaft may be varied within a wide range of angles. Both ends of the rotary shaft/spline are provided with respective crossheads.

Such an arrangement would require delicate balancing of is the crossheads. The problems associated with vibration in imbalanced high-speed shafts are well known; because of the magnitude of centrifugal forces due to the shaft speed, a slight imbalance is sufficient to cause high-amplitude vibrations leading to failure of structural elements of the machine.

The expense would not be justified further since there is no need to vary the direction of turbine shafts in a wide angle. Providing double crossheads in turbines transmitting high-speed (and low-torque) rotation by means of shafts which are designed to be aligned and stable is impractical and unheard of in such applications.

Another factor limiting the lifespan of the turbine is the maximum temperature to which the region at the edge of the turbine rotor vane 7 is subjected, this being the part most prone to stresses and temperatures. In particular, the flame front has to be confined to the hot region 4 of the combustion chamber, to avoid thermomechanical stresses on the rotor of the turbine generated by the flame in operation and during load transients.

The problem of confining the flame front to the hot region furthermore causes emission of contaminants as a product of incomplete combustion and problems of sudden flame quenching during acceleration and deceleration transients.

Another feature of conventional turbo-engine designs is the use of annular, countercurrentwise flow combustion chambers. These designs use a percentage of the air coming from the compressor for combustion in the so-called primary region 4' and the balance of air for diluting and cooling in the central region 4" usually known as secondary region. The so-called primary and secondary regions 4'-4" are parts of the hot region 4 respectively around and away from the ignition means 10.

Since the secondary region 4" borders on the tips of the rotor vanes 7 which are particularly susceptible to overheating, several attempts have been made to confine the combustion in an annular primary chamber 4', beginning with the formation of vortices during injection of the secondary flow. In my abovementioned AR patent publication AR 31,898 A1 this is achieved by means of orifices 5 which communicate the peripheral region 3 of the intake of cold air coming from the compressor 1 with the central secondary region 4" of the combustion chamber 4. To assist mixing and cooling of the wall, blades 47 are located on the inner face of the wall 48 separating the intake region 3 from the combustion chamber 4 to promote turbulence and vortices.

The location of the flame front inside the combustion chamber 4 is strongly dependent on the location and intensity of the vortices so that the flame front shifts under varying operation conditions to the extent that it may reach the rotor 7 under certain dynamic situations. An attempt to avoid this in my above-mentioned AR patent publication AR 31,898 A1 uses a flame arrester in the primary, up-current from the turbine rotor 7, implying the consequential addition of a device that requires high-temperature resistant materials and meaning more parts and loss of pressure, adversely affecting weight, simplicity, durability and efficiency of the turbo-engine.

U.S. Pat. No. 6,871,488 (to Oskooei) discloses a combustor chamber for a turbo-engine having a fuel nozzle for ejecting fuel with a radial component, i.e. initially towards the combustor walls. Deflector apertures, some of which are provided adjacent the nozzle and others tangentially in the combustor walls, provide a deflecting curtain of compressed air to counteract these radial flows towards the combustor walls so as not to excessively subject them to hot gases, detrimentally causing hot spots, and to help recirculate the fuel and air towards the axial direction as well as keep the flame on.

In fact, there is no knowledge in the art of computer-aided design systems for simulating fluidyanamic proceses with changes in chemical composition and generation of heat from combustion.

Another feature of conventional turbo-engine models is the use of RPM sensors for controlling the start-up sequence. The sequence consists in supplying energy to the starter system and, once a predetermined turning speed has been reached, the intake of fuel to the ignition injector is opened and the sparking plug enabled. The turbo machine increases its rotation speed even more until it surpasses the idling limit, after which the sparking plug is disabled and the supply of fuel to the running injectors is enabled. The use of a turning speed sensor (by proximity, optical or magnetic, inter alia), implies an additional electronic component, assembly tolerances and strict maintenance check-ups in view of that the start-up sequence is of critical importance.

U.S. Pat. No. 4,211,070 (to Portmann) discloses the use of oil to (in addition to lubricate) drive a starter-motor. An external oil pump is required to initiate the turbine start-up sequence. The start-up sequence is complex in the sense that it uses a RPM detecting device (not based on oil pressure), an RPM comparator, a controller which operates opening and closing valves together with its corresponding electromechanical actuator and associated piping. U.S. Pat. No. 5,234,315 (to Ogihara et al) discloses an apparatus determining a shaft rotational speed by measuring the oil pressure to check shaft integrity. There is no suggestion of using the oil pressure measurement signal as a logical trip signal is a turbo-engine start-up sequence.

Another feature of conventional turbo-engine designs is the insertion of the oil pump inside the gearbox, where it is difficult to reach, or, as suggested in my above-mentioned AR patent publication AR 31,898 A1, externally coupled to the low-speed shaft by means of gears. Hence a drawback is the need for an additional coupling gear, resulting in more parts, weight and difficult disassembling, detrimental to compactness and simplicity.

Another feature of conventional turbo-engine models is their use of several mechanical devices of considerable complexity, such as valves and throttles for controlling the injection of the fuel into the combustion chamber. These devices have to be adjusted with extreme precision because of the narrow tolerances they are built around and are intensely affected by variations of atmospheric conditions. Since these mechanisms are made up of a number of parts, it is considerably expensive and difficult to include redundant systems to improve the reliability thereof and of the entire engine turbine in general. Furthermore, the operation of these mechanisms involves a complex ignition and control procedure during which the different ignition stages have to be manually enabled and disabled, opening the door to a new range of potential faults arising from human operational errors.

The operation of the turbine may be automated by means of mechanical, electronic or hybrid systems. Although this reduces the probability of human error, yet more systems are added to the already extremely complex systems of the turbine per se, adding further penalties in terms of cost and weight and introducing new fault sequences.

Because the auxiliary systems of the turbo-engines are complex, the power consumed by the auxiliary systems of high-power turbo-engines is similar to that of the systems of small turbo-engines. This curtails the design and implementation of low-power turbo-engines, as upper limits in the power consumption of auxiliary systems come into play in order for the operation of the turbine at low-power cruising speeds be self-sustainable.

In my above-mentioned AR patent publication AR 31,898 A1, the fuel is injected into the combustion chamber using two conventional electrical fuel pumps operating in parallel. Both pumps are able to deliver 100% of the required flow-rate, thereby providing full redundancy. The small increment in the power consumption as a result of the redundant injector pumps is more than offset by the greater reliability of the system. Both pumps are automatically turned on when the ignition key selects the ignition mode by means of electric clamping relays. The clamping requires an oil pressure signal for enabling the pumps. The operation status of the pumps can be checked by the turbo-engine operator, for proper decision taking in case of malfunction of either pump. The electric power supply for the injector pumps and for the electric starter motor is obtained from a low-voltage, high-load capacity battery. A precision valve in series with the injection pumps regulates the flow of fuel into the combustion chamber, thereby controlling flow according to the pressure drop in the control valve. In order to regulate the fuel injection rate in the state of minimum power so that the reaction is self-sustainable (regulated speed), a capillary tube shunt hydraulically short-circuits the inlet and outlet of the injection control valve such that the injector pumps always receive a small flow of fuel, even when the control valves are completely shut. The system is thus less sensitive to the fuel injection rate at low speeds in relation to the position of the control valve, enhancing the power control precision of the turbo-engine.

This prior art has the drawback that the control valve has to be operated via servomechanisms or else by means of is the usual control cables, adding more devices with their attendant fault and maintenance rates.

In conclusion, it can be said that the traditional aircraft turboshaft designs cannot be extrapolated down to the low-power range and still match the reliability, durability, efficiency and simplicity required in commercial aviation or avoid drawbacks in maintenance and wear for the generation of electricity or useful work on the ground. As explained hereinbefore, this is due to the complexity and technical problems that need to be overcome go up as the power and the size thereof go down. Proof of this is that available low-power turboshafts used for fixed or military installations are very complex, have limited lifespan, require a lot of maintenance and are pretty expensive considering the low power levels involved.

SUMMARY OF THE INVENTION

The turbo-engine design of the present invention retains some of the general aspects found in my above-mentioned Argentine patent application publication AR 31,898 A1, but overcomes the technical problems mentioned hereinabove by means of an overall arrangement that places emphasis on simplicity and on a series of innovative systems. The present invention includes: an advanced combustion chamber with flame front stability control, a high-speed rotation transmission system, an internal oiling system, a gearbox system coupling the high-speed shaft to the power output shaft and the oil pump and a power-regulated and starting control system. These systems drastically reduce wear in the moving parts thereby improving efficiency of the turbo-engine and do away with the need of complex heat removal systems together with a decrease of mechanical stress on high-speed components subjected to load transients, without requiring additional components, increasing durability and reliability with minimum maintenance and reducing weight and the quantity of necessary parts.

The present invention consists of a compact turbo-engine providing better performance, greater durability and lower maintenance for delivering mechanical work on a shaft and thrust by means of exhaust gases and/or heat, with powers below 600 HP in its preferred embodiment. This turbo-engine comprises an air compression stage, an advanced annular combustion chamber providing flame conduction and flame front stability control by means of jets generating vortices in the cold region, a high-speed, cantilevered shaft to which the compression and expansion stages are integrated, supported by a pair of bearings placed in the "cold" side, wherein the high-speed bearings are lubricated by an efficient oil distribution and direction system, the compact gearbox using substantially planar gear-wheels, a starter control system, an electrical power-regulation and redundant electrical fuel injection system for power regulation and easily assembling systems between the gearbox and the compressor turbine subsystems by means of extractible splines conveying smooth transmission and reduced wear of the parts.

One object of the invention is to provide a suitable lubrication system for the bearings and associated elements of a turbine shaft turning at high speeds of over 25,000 RPM, typically 60,000 RPM using a pumped mixture of oil and air that turns into a spray at such speeds. A related object of the invention is to reduce the speed of the oil spray impinging on the bearing rollers to avoid the oil from dispersing without properly wetting and oiling the bearing elements. Friction and loss of power may thus be constrained and the air in the mixture assists in cooling the bearing rollers. The speed reduction is achieved by causing the lubricant mixture to travel in the axial direction along the inside of the hollow shaft such that the speed of the latter causes it to rotate and form a cyclone having a radial speed pattern which roughly copies the bearings movement. A further related object is to also use the lubrication mixture for cooling the bearings.

Another object of the invention is to prevent a high-speed rotation system from transmitting high-amplitude vibration components due to imbalance and from being submitted to undue stresses causing early wear and fatigue due to assembly eccentricity and misalignment. This is achieved by coupling the high-speed shaft of the compressor-turbine system to the high-speed gearwheel of the step-down gearbox system by means of a spline fluted at both ends such that it may pivot about a reduced angle at either end on the turbine shaft and gearbox wheel respectively. The doubly-fluted spline provides a transmission which is rigid in the azimutal and loose in the radial, axial and angular (misalignment) direction, thereby decoupling radial and axial vibrations (azimutal vibrations are dampened by other means at the low-speed side of the gearbox system). Further objects are that the spline be simple and relatively inexpensive to manufacture with relaxed tolerances and simple to assemble with relaxed precision and to remove for turbo-engine maintenance or repair.

Another object of the invention is to design a longitudinal bore in the spline for carrying out the dual functions of conducting a mixture containing lubricant droplets under the effects of strong centrifugal forces (e.g. 40,000 G) to the radial orifices in the spline prior to injecting on the spline bearings and of using the droplets in said mixture to self-balance the spline to reduce vibrations generated by spline imbalance at rotation speeds within an operational range, thereby further relaxing manufacturing tolerances of the spline and simplifying assembly thereof to the turbine. Lubricant droplets are pumped into one end of the bore and, due to centrifugal force at high rotation speeds of operation, flatten against the borewall forming a fine layer that follows a path having the larger gradient.

According to this aspect of the invention, the bore tapers slightly to make certain that the gradient is directed towards the radial orifices irrespective of some misalignment or imbalance of the spline assembly, eccentricity of the conduit bore or unevenness in the bore diameter. The lubricant flow-rate within the spline bore may be roughly doubled with a taper of about 1°.

In addition, a small circumferential recess or cavity component is formed on the frustoconical borewall for holding the droplets therein in a spline self-balancing distribution, i.e wherein the azimutally unconstrained droplets tend to naturally reposition themselves on the borewall in such a way that they to counter any out-of-balance forces (the self-balancing effect is similar to the popular wisdom of throwing sand inside tyres). Testing has shown significant dampening of vibrations generated by slight misalignments of the spline at high speeds of operation with a cavity depth of about ½ mm.

Yet another object of the invention is to improve the generation of vortices in the secondary gas flow conventionally used for protecting the chamber walls from hot spots, to provide flame front control and stabilizer means in the combustion chamber of a turbine, thereby strengthening combustion during transient situation such that the turbine is easier to maneuver, is safer and has a swifter response, by means of deflection members placed around the edges of the secondary flow passages on the cold region side of the wall dividing the hot and cold regions to obstruct the direct flow of gas through the passages. Testing has proved that the provision of such deflectors on both sides of the wall generate more efficient vortices for confining the flame front, particularly from reaching the vanes of the turbine rotor. A critical transient is sudden deceleration, in which case the deflectors stop the flow from colliding against the flame, which would otherwise blow a not too strong flame out, since the inertia of the compressor maintains a pressurized flow of cool air. The flame is strengthened and stable for all operation conditions. Due to the previously stated lack in the prior art of software codes for simulating fluid-dyanamic proceses with changes in chemical composition and generation of heat by combustion, I developed informal design methods on my own for testing combustion chambers and arrived at the obstruction deflectors designs of the invention after extensive trial and error.

Yet a further object of the invention is to provide a simple and inexpensive yet reliable method and means for controlling the start-up sequence in a turbo-engine. A particular object is a turbine start-up control method and means which may be started simply the turn of a key (or similar action) to proceed immediately thereafter and then be terminated automatically by a simple relay signal when the turbine is idling at the right speed. The engine uses an on-board oil pump for circulating oil lubricating bearings, cogs and other moving engine parts, the pump driven by a rotary output shaft of the turbine. According to this aspect of the invention, a calibrated oil-pressure bulb is coupled to the pump or to the oil circulation system down-current from the pump, the bulb including a relay which switches to terminate the start-up sequence when the oil pressure exceeds a set threshold indicating that the turbine has reached a speed of normal operation.

BRIEF DESCRIPTION OF THE DRAWINGS

The above-stated and other novel features and aspects of this invention and how it may be reduced to practice may be understood better from the following detailed description of a preferred embodiment shown in the attached drawings, wherein:

FIG. 6A is a schematic longitudinal-section view of the coupling mechanism for transmitting rotational power from the high-speed shaft of the compressor-turbine assembly to the shift-down gearbox of the turbo-engine of FIG. 3 according to an embodiment of the invention, showing the bearing lubrication system and path followed by the oil therein and.

DETAILED DESCRIPTION OF A PREFERRED EMBODIMENT

Figure 3:
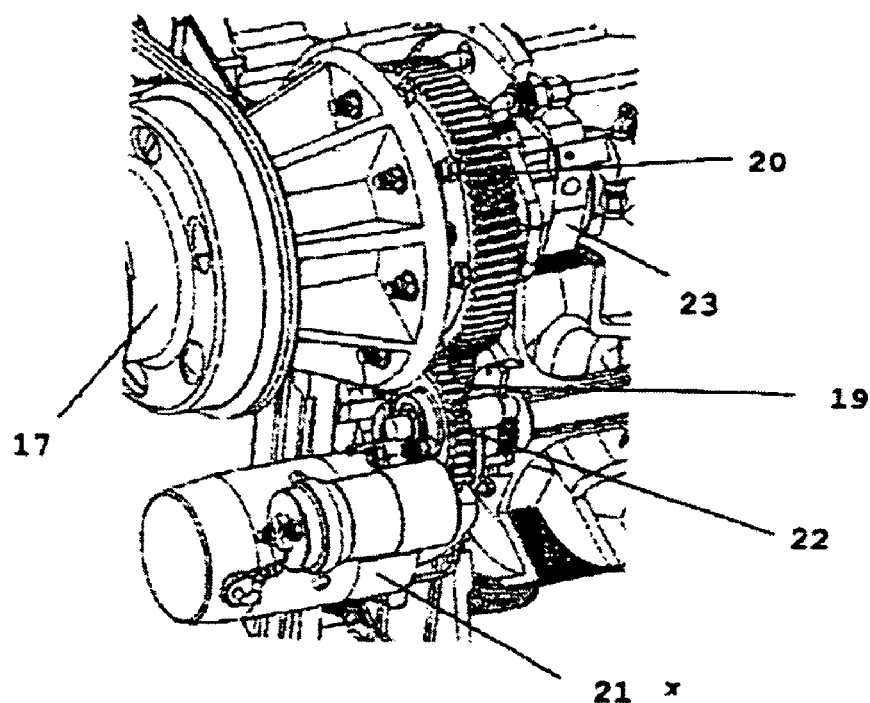
FIG. 3 is a partial perspective view of a turbo-engine according to a preferred embodiment of the present invention for use in light aircraft.
Figure 4A:
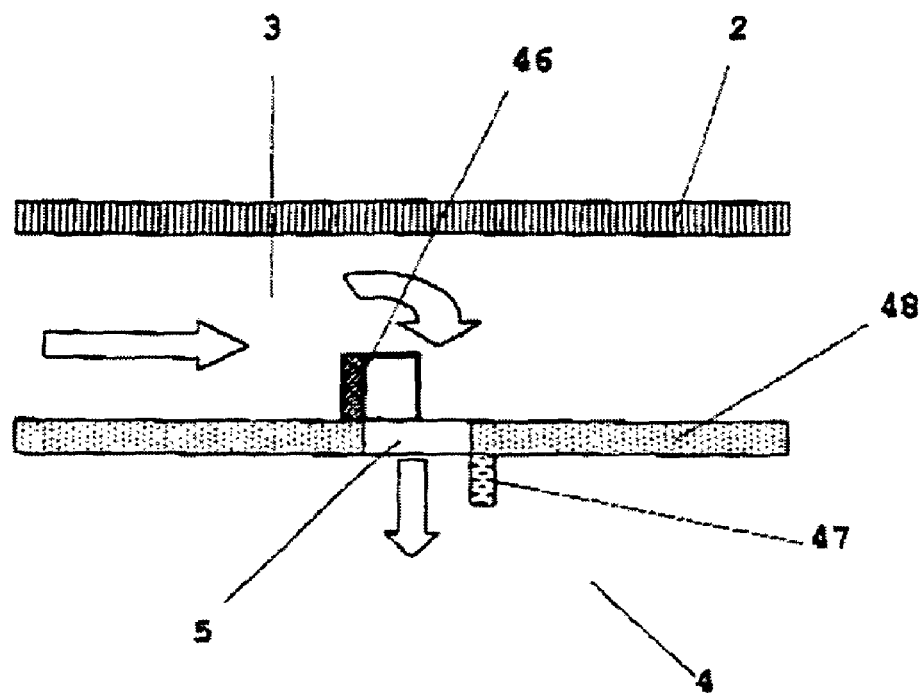
FIG. 4A is a perspective inside view of the turbine and the compressor rotors of the turbo-engine of FIG. 3, arranged on the cantilevered high-speed shaft, also showing the removable spline coupling according to an embodiment of the invention.

FIG. 3 illustrates the arrangement of a turbo-engine according to the present invention, designed for use in light airplanes and helicopters. As illustrated in FIGS. 4A and 6A, the engine is assembled with a hollow high-speed shaft 8 on one end of which a turbine 7 and a 200-HP centrifugal compressor 1 of the radial-vane type are mounted. The high-speed shaft 8 is supported on a pair of bearings 9A and 9B which are externally anchored by means of a jacket 14. The turbine shaft 8 is made of SS310 stainless steel, has an outer diameter of about 2 cm and its typical speed is 60,000 RPMs. The jacket 14 has an outer diameter of about 45 mm and is about 15 cm long.

Figure 6B:
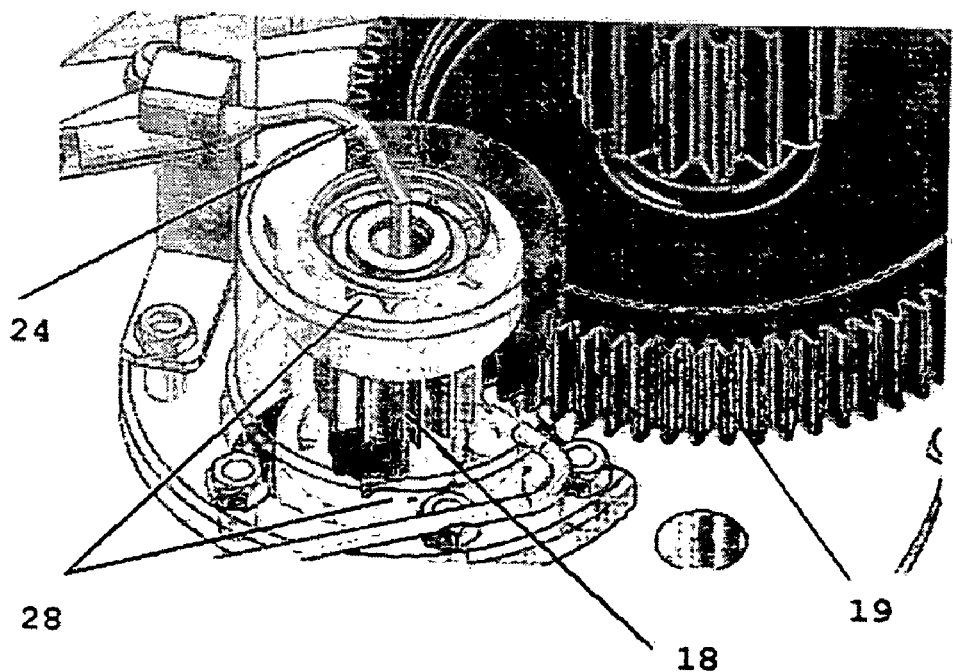
FIG. 6B is a perspective view of an oil injection arrangement for the lubrication system of FIG. 6A.
Figure 6A:
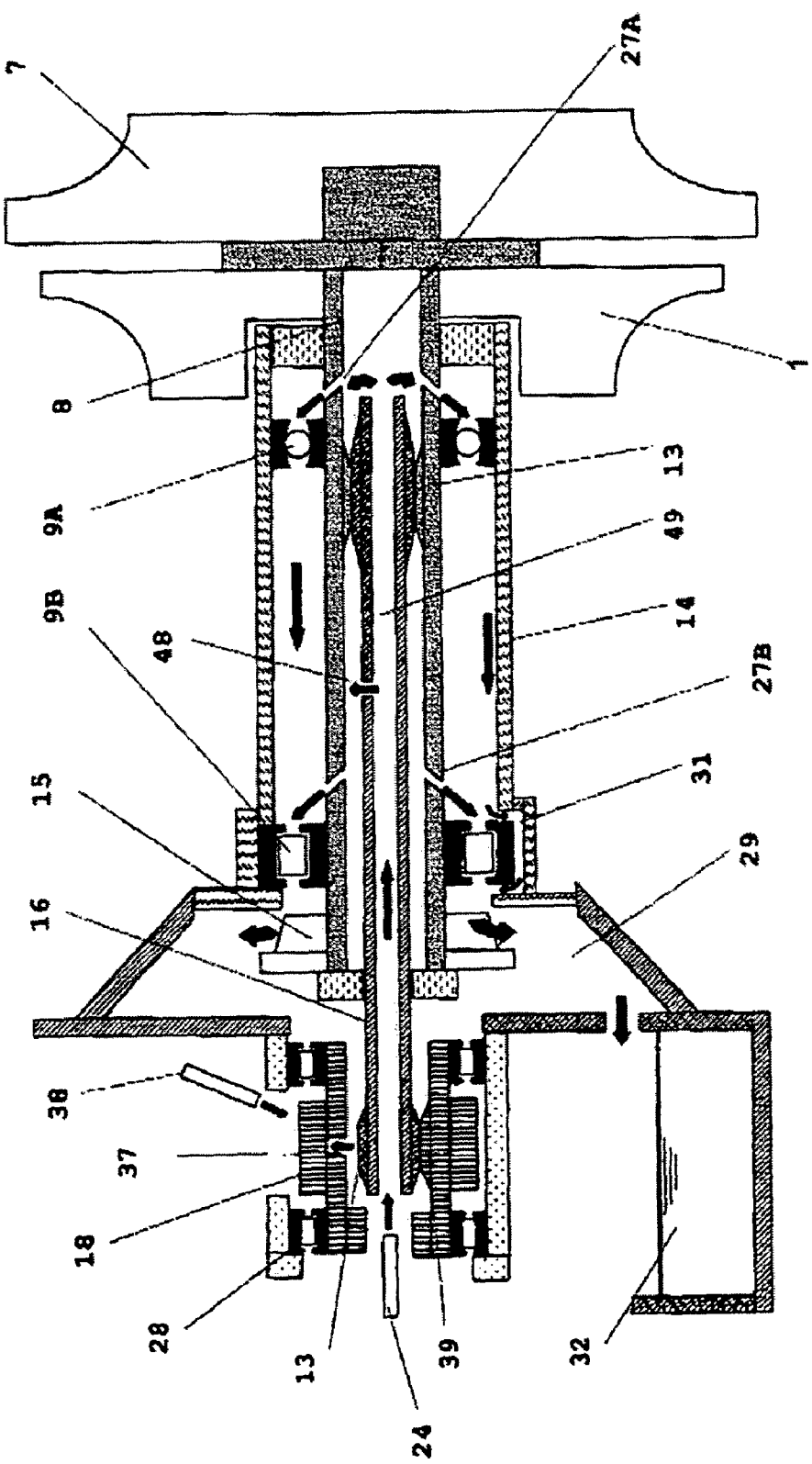
Figure 7B:
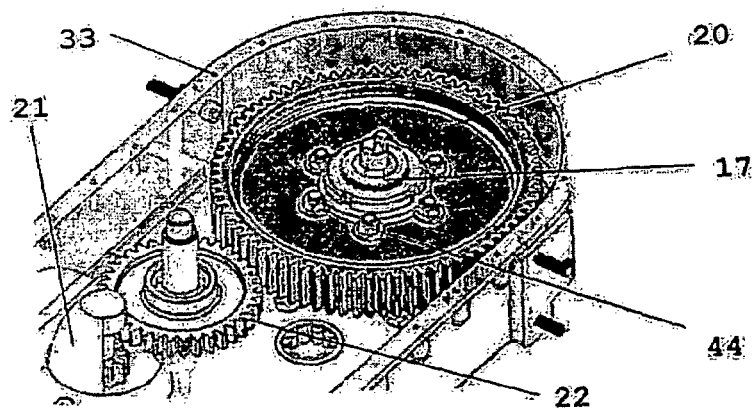
FIG. 7B is a perspective partial view of the gearbox casing including the low-speed gearwheel of FIG. 7A.
Figure 7A:
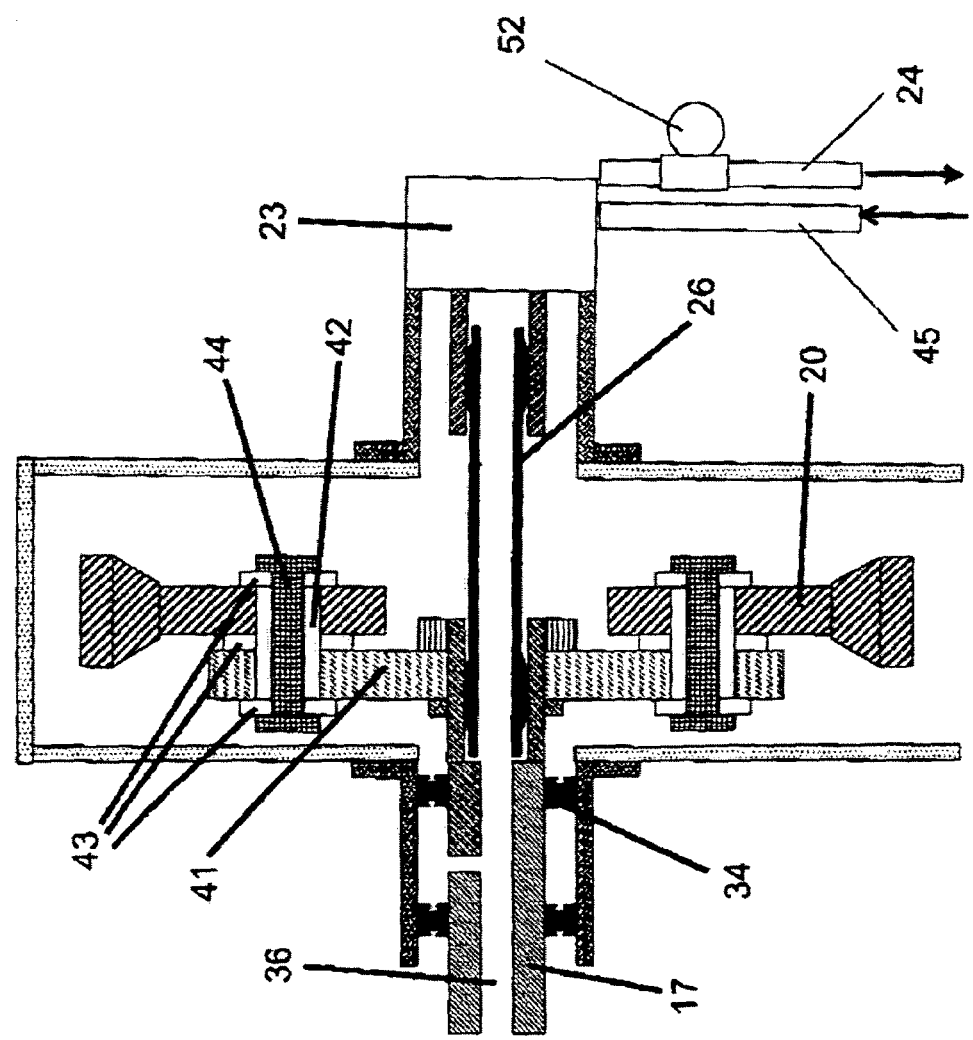
FIG. 7A is a schematic cross-section of the coupling assembly between the low-speed power transmission shaft and the shift-down gearbox and the coupling to the oil pump, the assembly including a vibration decoupling mechanism according to an embodiment of the invention.

Referring also briefly to FIGS. 6B and 7A, kinetic rotational power produced by the turbine 7 on its high-speed shaft 8 is outputted on a low-speed shaft 17 by means of a compact gearbox 18-20. The output shaft 17 is mounted on lubricated bearings 34 and is also made of SS310 stainless steel, has an outer diameter of about 5 cm, its typical speed is 2,500 RPMs and supplies mechanical power to typical aircraft mechanisms such as propellers, alternators, accessories and the like (not illustrated). The step-down gearbox 18-20 includes parallel planar or small-angle gear-wheels which simplifies assembly and lubrication thereof. Speed step-down is carried out by means of a high-speed gearwheel 18 (FIG. 6A), an intermediate reduction gearwheel 19 and a low-speed gearwheel 20 made of Alloy 4140 Steel. The high-speed gearwheel 18 is axially-rigidly mounted on a tandem of bearings 28. The low-speed gear 20 is approximately 20 cm in diameter and 4 cm across. The overall transmission ratio is 24:1.

Figure 1:
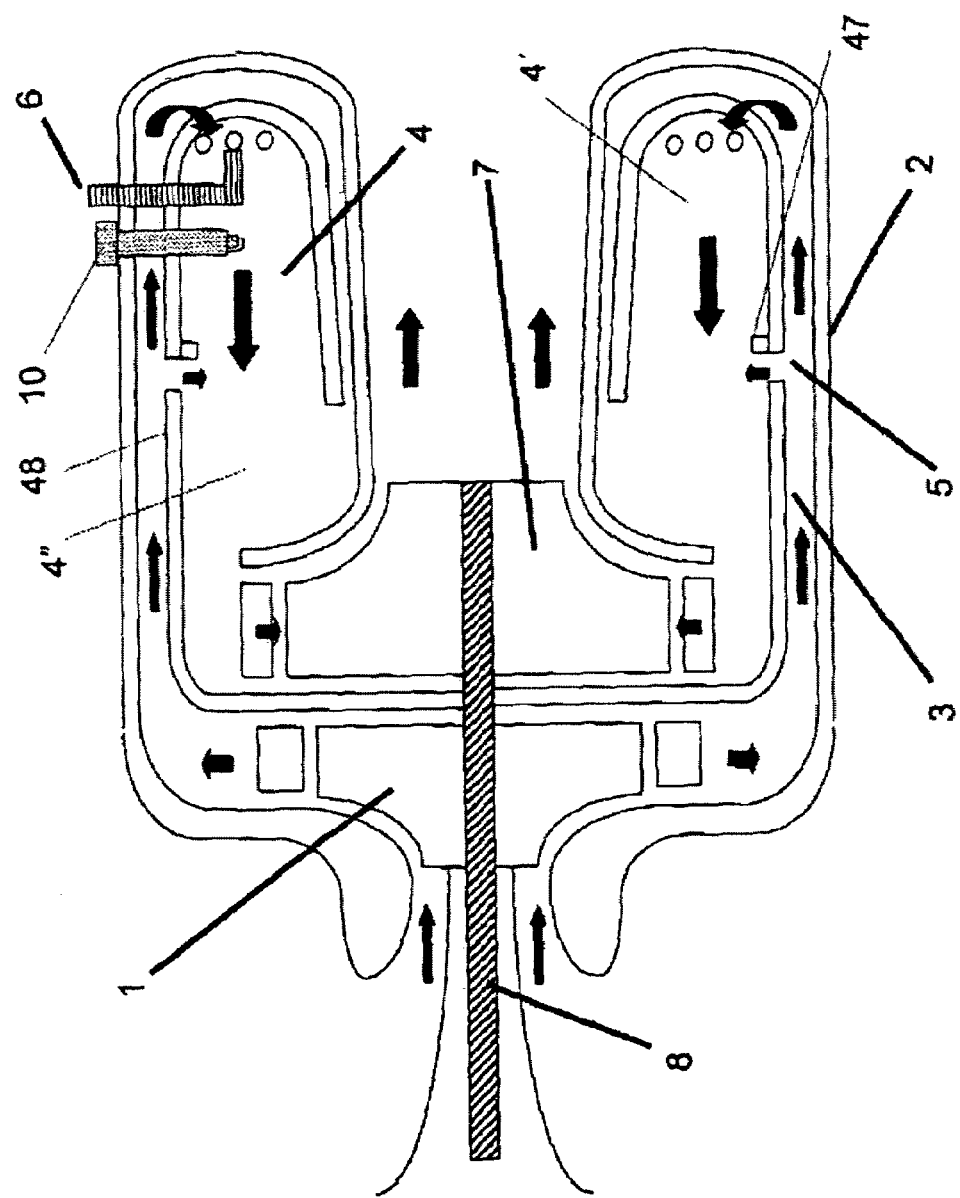
FIG. 1 is a schematic of a prior art compact turbo-engine having an annular combustion chamber and showing the path followed by gases inside there.
Figure 2:
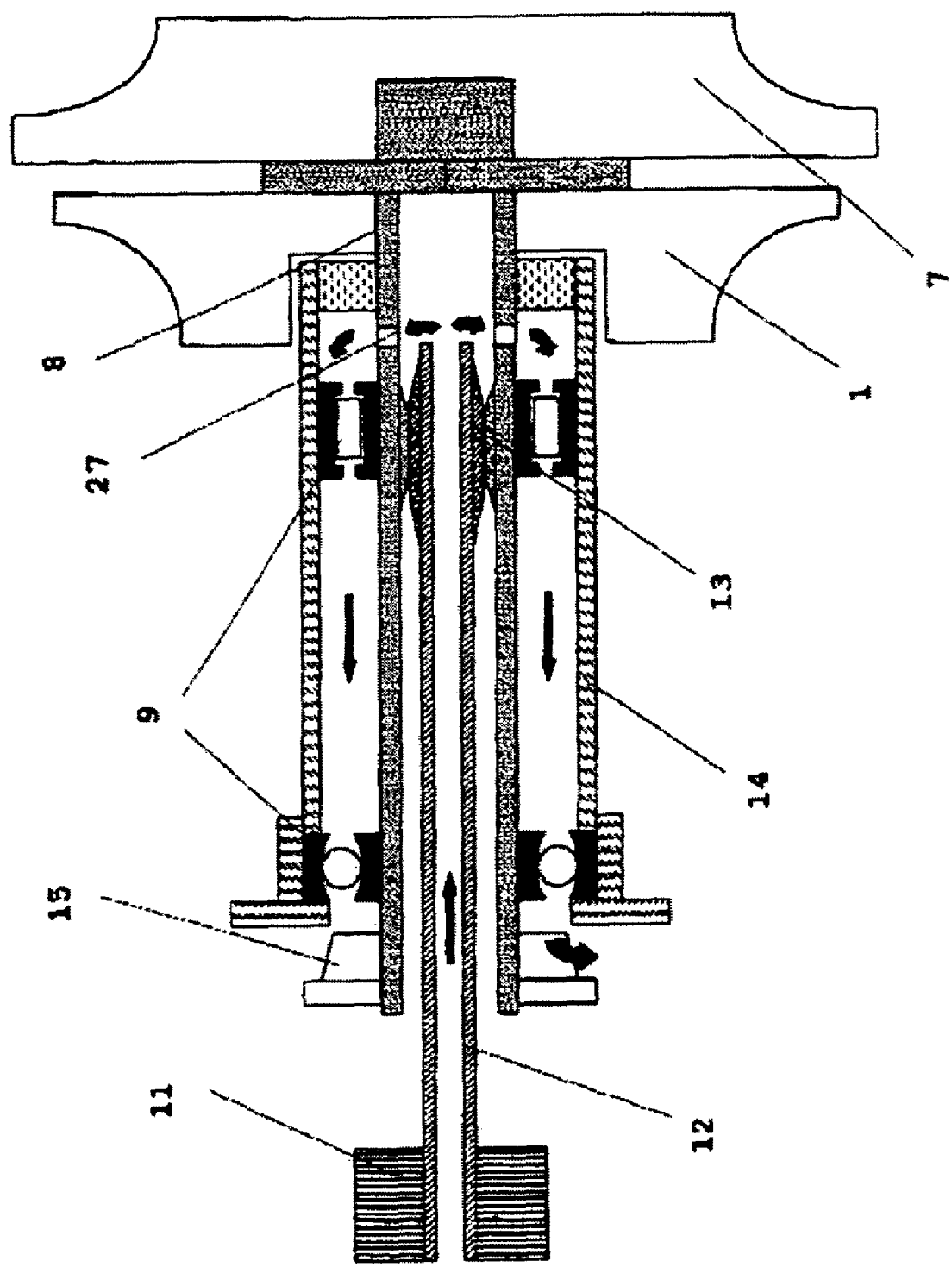
FIG. 2 is a schematic side-section view illustrating in detail a part of a prior art system for lubricating the bearings of the main cantilever shaft of FIG. 1 and the path the oil follows therein.
Figure 5A:
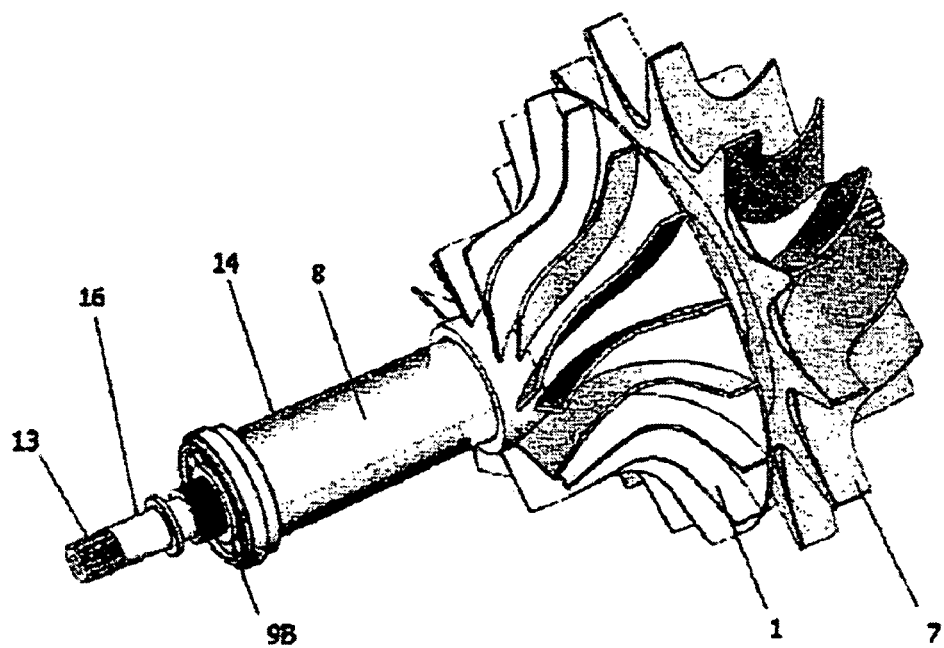
FIGS. 5A and 5B are respective cross-section and upper views showing the vortex generator means on the cold side of the combustion chamber, near to the orifices providing communication to the hot region in the secondary, and the path followed by gases, according to an embodiment of the invention.
Figure 5B:
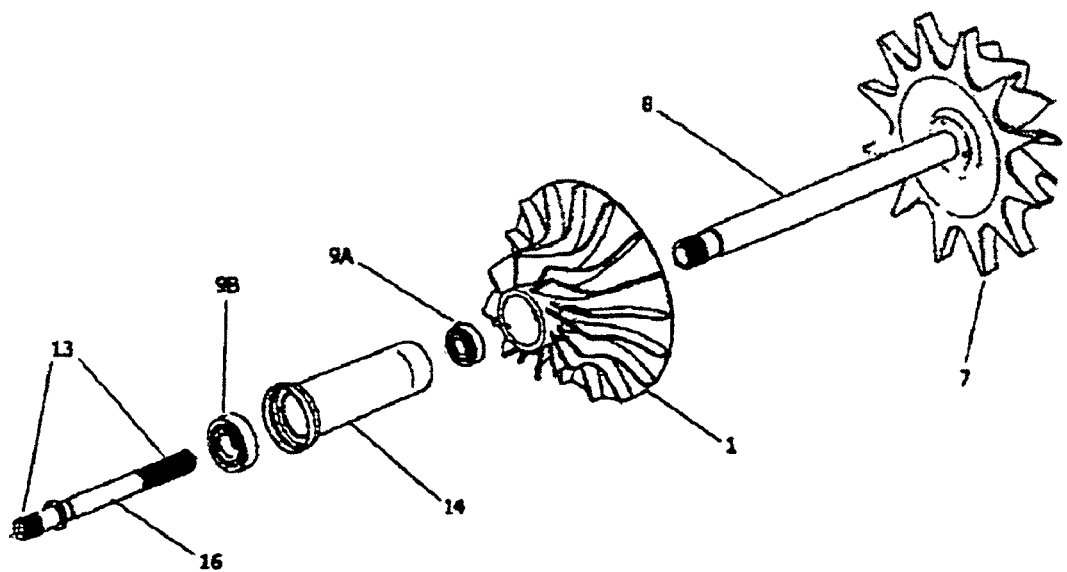

The Combustion Chamber System:

FIGS. 5A and 5B show how the combustion chamber of FIG. 1 is modified by a device 46 for generating vortices of the incoming secondary flow to the hot region 4 of the combustion chamber. As illustrated in FIG. 1, the combustion chamber 2 is of a compact, toroidal shape such that the distance traveled by the air inside the chamber is longer than the major axis of the chamber 2. The combustion chamber 2 is made of Inconel 713 material, measures about 150 mm long by 260 mm external diameter and is provided with six counter-flow fuel injectors 6 (FIG. 1).

Each vortex generator device comprises an approximately semicylindrical deflector member 46 which is located on the wall 48 on the side of the cold region 3, up-current (relative to the gas flow direction in the inlet region 3) from the conventional orifices 5 communicating with the hot region of the combustion chamber. In one embodiment, each deflector member 46 is slightly taller than the diameter of orifice 5 (which can be e.g. 2 mm in a 10 HP miniturbine up to about 40 mm in a 1,000 HP turbine. The deflector members 46 are of the same material as the outer wall of the chamber to avoid thermocouple e.m.f. and are spot-welded thereto.

FIGS. 5A and 5B also illustrate how the gas must deflect to get around the obstruction offered by the members 46, promoting the formation of vortices in the flow through the orifices, known as the secondary flow in the combustion chamber. The intensity of the vortices depends on the flow-rate, so the greater the flow-rate the greater the effect. The prior art only provides means 47 for promoting mixing on the face of the hot region 4.

The forward part of this hot combustion region is called the flame front. The purpose of injecting a cold flow into the hot region of the combustion chamber is to cool the confinement walls 48 of the hot region, guide the outlet flow from the hot region and furthermore reduce the temperature of the outlet gases, which are a product of the combustion, prior to flowing towards the rotor 7. On the other hand, atmospheric contaminants produced by the combustion appear when the temperature of the combustion products is kept very high to produce association and disassociation of the molecules. By injecting the secondary flow into the hot region of the chamber, these effects are reduced, depending on the degree of mixing turbulence in this region.

By means of the above-described members 46, the flame front during normal running and during fast power transients is confined, thereby enabling a very good dynamic response to power variation, without the need of flame arresters to prevent the flame from reaching the more mechanically delicate region of the turbine or strongly limit the rates of acceleration and deceleration. Moreover, combustion is good and contaminant emission is low.

The Loosely-coupled Power Transmission System:

Referring to FIG. 6A in particular, transmission of power from the turbine-compressor assembly 1-7 to the gearbox 18-20 is accomplished by means of a removable hollow spline 16 coupled between the high-speed shaft 8 and the high-speed gear 18. The spline 16 is made of SS310 stainless steel, has an outer diameter of about 15 mm and is also about 15 cm long most of which is housed inside the hollow shaft 8.

An outstanding feature of this transmission is that the spline 16 is loose and, hence, may compensate thermal expansion between both subsystems, facilitates assembly of the high- and low-speed both subsystems and may be removed for changing or repairing.

Figure 4B:
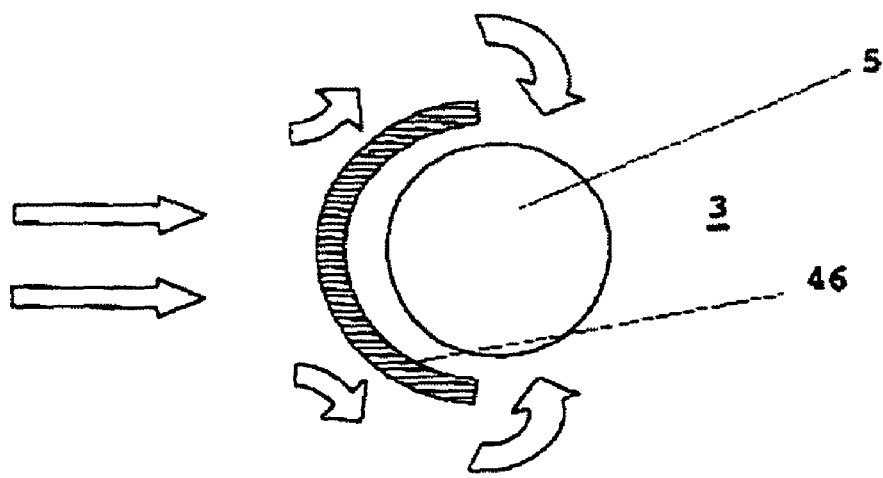
FIG. 4B is an exploded view of the turbine arrangement of FIG. 4A.
Figure 6C:
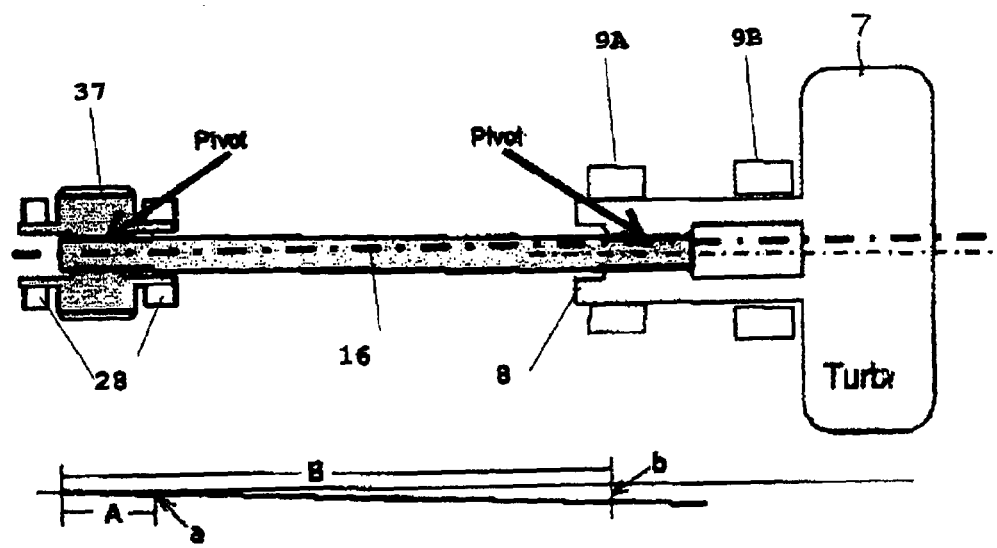
FIG. 6C is a longitudinal schematic illustrating misalignment of the coupling mechanism of FIG. 6A.

In contradistinction to the prior art, this spline 16 is fluted 13 at the both ends as particularly depicted in FIGS. 4A, 4B and 6A, providing a loose pivotable coupling to both the turbine shaft 8 and the high-speed gear 18. In particular, the high-speed gear 18 is hollow thus defining a central cavity having longitudinal grooves 39 for engaging corresponding fluting teeth 13 provided also on this end of the spline 16. At other end of the spline 16, the fluting 13 on the spline portion housed inside the cantilevered shaft 8 likewise loosely couples these members 8, 16 allowing for pivoting about a small angle. FIG. 6C illustrates how the axes of the high-speed the turbine shaft 8 and the high-speed gear 18 may be relatively off-center and how the doubly-fluted feature 13 prevents a misaligned spline 16 from becoming stressed.

The amount of admissable misalignment and eccentricity of the spline 16 depends on the amount of play of the fluting 13 coupling. As evident in FIG. 6C, if B is the length of the spline 16, A the length of the fluting 13 inside the high-speed gearwheel 37 and a the fluting 13 play in the high-speed gearwheel grooves 39, then the maximum eccentricity b at the opposite end of the spline 16 is:

$$b = \frac{B}{A}a,$$

i.e. the maximum eccentricity b is proportional to the amount of play in the coupling 13-39. The fluting 13 at either end of the embodied spline 16 is designed to admit eccentricities of between ½-1 mm. Naturally, the best match is to avoid all eccentricity and misalignment, at least to the extent that it is economically justified.

Additional Vibration Dampening Means:

In addition, since the couplings are furthermore bathed in oil, vibrations are decoupled on both sides of the coupling, thereby lowering stresses on the bearings 9A-9B, 28 and 34. The oil film that is formed on the cog surfaces has the advantage of further decoupling vibrations of the turbo-engine assembly from the step-down gearbox which are at considerably different frequencies and intensities. Very good gear alignment may be achieved to extend the lifespan thereof. All these features reduce tolerance severity in the assembly of both subsystems and, therefore, may be used in installations which are less complex than current installllations.

The vibration decoupling device avoids rigid metal-metal contact through the power transmission path. The device is implemented by inserting resilience materials between the low-speed gear 20 and the power output shaft 17. There is a wide range of commercially available materials that can be used for this application. The strength and the elasticity of the material will depend on a particular design of gear-box, its operating temperature, chemical environment, vibration level and the maximum shaft torque. In this gear-box embodiment for the power turbine application, Teflon™ is selected as a resilience material of bushing means.

To prevent wear and decouple vibrations between the load connected to the power output shaft 17 and the gearbox, the embodiment represented in FIG. 7A uses a coupling made of a resistant and resilient material. The coupling mechanism between the power output shaft 17 and the planar gear 20 comprises a disk 41 made of SS310 stainless steel mounted to the shaft. The disk 41 is provided with orifices in which a resilient bushing having a sleeve 42, Teflon™ separator washers 43, between the coupling disk 41 and the gear 20, and steel bolts 44 are assembled. In the preferred embodiment illustrated in FIG. 7B, six standard DIN 931-M8 bolts 44 sheathed in Teflon™ sleeves 42 are used for affixing the low-speed gear 20 to the power output shaft 17, allowing proper power transmission and damping vibration therebetween.

This coupling is similar to that between the collars of tubes, for instance, except that the steel bolts 44 are sheathed in a sleeve 42, in addition to the washers 43 arranged bolt heads, the disk 41, the gear 20 and the nuts for tightening the bolts 44. In this way, a loose (i.e. not rigid) yet stable coupling mechanism is achieved with no metal-to-metal contact between the coupling disk 41 affixed to the transmission of power shaft 17 and the gear 20. The use of bushings and washers of elastic materials blocks high frequencies from the power shaft 17 which would otherwise affect the useful lifespan of the bearings 34 and the housings thereof. In this way low-cost alloys may be used for the housings. The resulting amount of vibration decoupling is similar to that obtained conventionally with rubber disks which absorb angular vibrations, thereby extending gearbox lifespan.

The Lubrication System:

The moving parts of turbo-engine, including the bearings 9A and 9B, are lubricated using commercial turbine oil. I have found that the turbo-engine of the present invention is able to operate at speeds of up to 70,000 RPM on the high-speed shaft, with an extended life-term of the high-speed is shaft bearings 9A-9B by means of the oiling system shown in FIGS. 6A and 6B. In addition, the physical arrangement of the annular combustion chamber, compressor and turbine together with the arrangement of the pair of bearings 9A-9B in the cold region of the cantilever compressor-turbine assembly allows the oil operation conditions on the bearings 9A-9B to be relaxed.

As shown in FIG. 7A, the lubrication system uses a positive-displacement external pump 23 which is mounted to the low-speed power output shaft 17 to derive mechanical power therefrom for oiling components of the turbine 7 in a manner described in more detail hereinafter. The pump 23 is mounted to the low-speed power output shaft 17 by means of a removable spline 26. This simplifies maintenance thereof since it is easy to dismantle the pump from the gearbox. This spline 26 is made of SS310 stainless steel and is approximately 15 mm de diameter and 10 cm long.

A pipe 45 draws oil from a reservoir 32 together with air into the pump 23 and the resulting mixture is pumped out through an outlet pipe 24. Referring briefly to FIG. 6B, the pipe 24 connects the pump outlet to the high-speed shaft 8. As shown in FIG. 6A, oil from the pipe 24 enters through one end of the bore 49 longitudinally traversing the hollow spline 16 and is injected through orifices 48 and out of the distant end of the spline bore 49 into the shaft 8 where it is directed towards the ball-raceways of the bearings 9A-9B. There are at least six orifices 27A-27B evenly distributed around the shaft circumference, each sub-millimeter in diameter and slanted at an angle. In an alternative embodiment, there are no orifices 27B near the middle of the shaft 8 but only near the end of the shaft away from the oil supply pipe 24, such that both bearings 9A-9B are lubricated in series with the same lubricating jet passing through orifices 27A.

Figure 6D:
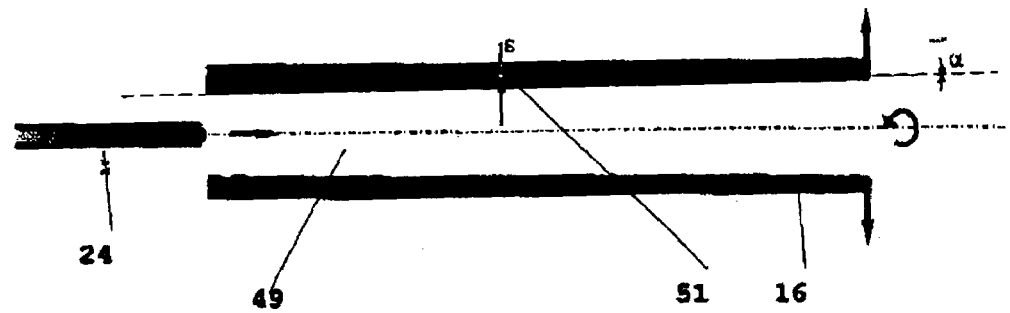
FIG. 6D is an enlarged schematic view showing a longitudinal section of the spline of the coupling mechanism of FIG. 6A.

As schematically illustrated in FIG. 6D, the spline 16 preferably has a slightly frustoconical bore 49 tapering outwards at an angle of $\alpha=1°$ towards the distant end thereof for assisting in conducting the lubrication mixture therealong at high shaft speeds. In addition, a circumferential cavity 51 about $\epsilon=\frac{1}{2}$ mm deep is recessed in a plane containing the center of gravity of the spline 16 wherein oil droplets may distribute in a way to counter imbalance at high operational speeds, thereby producing a self-balancing effect on the spline 16.

The oil is urged outwards by effect of the centrifugal force of the shaft 8, in the form of a spray or mist formed by droplets traveling in a cyclone at a calculated absolute speed of up to 60 m/s due to the high-speed rotation of the shafts and centrifugal force. Since the oil incident velocity approaches the orbiting speed of the bearing rollers (or balls), the relative speeds between the oil jets and the balls is thus small, the droplets are injected on the bearing balls without or with little dispersion. In this way, the oil effectively wets the raceways of the bearings 9A-9B and friction between the balls or rollers and the raceways is substantially reduced, consequentially reducing wear and heat of the contact zones to a minimum. Moreover, the temperature of the oil does not become excessive, i.e. over 85° C., and contamination of the parts is prevented, warranting extended durability or useful lifespan of the mechanical parts and of the oil and filters. Each orifice 27A-27B may have a diameter of ½ mm and may be slanted at an angle up to about 30° to the perpendicular.

The oil is drawn out of the bearings 9A-9B and driven towards a discharge chamber 29 by a radial-vane type blower 15. The blower 15 is turned at the same high speed of 60,000 RPM and essentially enables a large amount of lubricant to be removed from the bearings 9A-9B, contributing to the formation of the droplet spray and to removal of heat from the bearings 9A-9B via the removed oil-and-air mixture. An important function of the blower 15 is to prevent the bearings 9A-9B becoming inundated in oil since this would generate significant braking and frictional heating at such high speeds.

To facilitate good circulation of the lubricant coming from the bearing 9A nearest the compressor 1, a shunting passage 31 having a section equivalent to a 1 mm diameter orifice is channeled over the jacket 14 to bypass the downstream bearing 9B. The lubricant present in the discharge chamber 29 is drained towards a lower reservoir 32 of the step-down gearbox, where it cools by mixing with the residue oil stored therein. To keep the oil temperature below safety limits, say 85° C., the reservoir 32 holds at least 2 liters of oil in this embodiment.

In view of that the oil is scarcely heated up during passage through the bearings 9A-9B at high speed using this lubrication system, no coolers are generally needed to keep the temperature from exceeding the range in which its properties are not degraded. When generally operating at less than full power or for intermittent periods of some tens of minutes, the outer surface of the gearbox casing 33 is sufficient for cooling the oil stored in the lower reservoir 32 of the gearbox through heat-exchange with the surrounding environment and conduction through the outer casing 33 of the step-down gearbox and external convection, assisted by the inflow of air under forced convection to the compressor 1.

However, in a poor heat-removing environment, an external conventional radiator may be inserted in the oil circuit through additional piping downcurrent from the oil pump. In order to assure continuous operability at full 150-HP power regardless of weather conditions, an oil radiator de 15 cm (length)×30 cm (height)×5 cm (width), typically available from motorcycle dealers, is adequate for keeping the oil temperature below 85° C. In this case (auxiliary radiator) the total oil volume (i.e. sump plus circulating) should be increased by ½-1 liter.

All this contributes to a simple, small and lightweight system. Another by no means minor consequence for the turbo-engine is that friction is low and, therefore, very little mechanical energy is converted into heat and wasted so that machine efficiency is increased.

The implementation of such a system can be accomplished by modification and adaptation of commercially available high-speed bearings and stainless-steel pipes. Sizing and materials are dependant on a particular design of the engine. Stainless-steel pipes (adequate for high pressure and high temperature lubricants) are available in wide range of variety in diameter and thickness. High-speed bearings are also commercially available in wide range of inner diameters, outer diameters and materials (plastic, ceramic and metal alloys). The right choice of components depends on a particular design parameters of the engine. Mainly, moment of inertia and torque requirements determine shaft diameter which, in turn, determines the inner diameter of the bearings.

For the present embodiment, the preferred materials of the bearings 9A-9B are ceramic or metal alloys for ease of machineability and further modification and adaptability to this high speed lubrication system. In the current embodiment, a stainless steel tube having an inner diameter of 6 mm is used. For the bearing system 9A-9B of the high speed shaft 8, two standard cylindrical roller-bearings type DIN5412 having an inner diameter of about 2 centimeters are found to satisfy the mechanical requirements of the present turbine embodiment.

The pump 23 draws in cooled oil through a duct 45 from the reservoir 32, passing through a filter on the way, and distributes the oil towards the central cavity of the high-speed spline 16 through the ducts 27A-27B and towards the bearings 9A-9B of the power output shaft 8 as described hereinbefore. The high-speed gearwheel 18 is oiled through orifices 37 passing through the base of the cogs thereof from the central cavity, from where the oil flow is driven by centrifugal force from the centre, and by injection from a duct 38 coming from the discharge outlet of the pump 23 in the oil circulation system, as indicated by the arrows. Turning again to FIG. 7A, oil is also directed towards the bearings 34 of the power output shaft 17 through a central cavity 36 in the latter shaft and to the gears 18-20 by means of distribution ducts.

The Start-up System:

The turbo-engine start-up sequence uses a battery-operated electric starter-motor 21, such as a 3 kW, 12V, Prestolite M93R starter, coupled to the low-speed gearwheel 20 by another gearwheel 22 also made of Alloy 4140 steel. The motor 21 may be started by the turn of a contact key switch (not illustrated) to initiate the start-up sequence to begin to rotate the turbine 7 via the low-speed gearwheel 20 until the turbine 7 reaches a set speed.

With a view of reducing the quantity of components and maintenance check-ups, the sensing of the rotation speed of the turboshaft for controlling the start-up sequence is carried out by measuring the oil pressure at the outlet of the positive-displacement oil pump 23 used for distributing oil to lubricate the moving parts of the turbo-engine, as explained hereinbefore. The pressure in this kind of pump 23 is proportional to the rotation speed of its driven shaft. Since the pump 23 is directly coupled to the low-speed shaft 17 and, via the step-down gearbox to the shaft 8, of the compressor-turbine assembly, a bulb 52 calibrated at a predetermined pressure, i.e. RPMs, may be used for controlling the start-up sequence. This system is moreover robust and resistant to vibrations, and dramatically reduces maintenance requirements and assembly tolerances of the complex turning-speed measurement systems like, e.g. proximity, magnetic or optic sensors or the like.

The turbine start-up sequence thus is based on a simple electric circuit and is controlled by only one on-off signal. The signal is generated by the calibrated oil pressure sensor 52 and assures lubricant delivery (for safe running of the turbine 7) and suitable engine RPMs to reach the idle-condition once the fuel injection is enabled.

One of the advantages of this start-up sequence is that eliminates virtually all the failures based on human factors. The operator need only turn a contact switch and pay attention to the temperature gauge (which can be easily automated). When the operator turns the start key, the starter motor 21 turns, the convention electric spark generation circuit is enabled and the oil pump 23 begins to operate. Speed and oil pressure gradually increase until the oil pressure bulb 52 goes out. At this stage, the fuel pump is switched on and the engine speed, oil pressure and exhaust temperature continue to gradually increase. The start-up sequence is finished, the starter-motor 21 is decoupled and the spark circuit disabled. The engine speed and the exhaust temperature stabilize.

Current implementation is accomplished by commercially available automobile starter motor 21 and the oil pressure sensor 52 is also commercially available. The Prestolite M93 Starter mentioned hereinbefore, which is preferred in the present embodiment, is widely available for different motor vehicle models.

Other Features:

A particular feature of the compact turbo-engine is that the dynamic system comprising the turbine 7, the combustion chamber 2 and the compressor 1 exclusively depends on the injection of fuel into the combustion chamber and the load applied to the power output shaft 17, so that the operator is left with just a single degree of freedom to control the turbine: i.e. regulating the fuel rate. This feature makes the operation of the turbo-engine extremely simple since the operator just regulates the fuel intake and the dynamic system self-adjusts to reach the RPMs corresponding to the operation status given by the relationship between the load and the fuel intake.

The use of electric pumps or compressors in the fuel injection system provides for electronic control of the current. Fuel intake into the combustion chamber is controlled both during start-up and normal running. Moving systems are avoided, such as cables, valves, servomechanisms, etc. which, to assure proper operation, require periodic maintenance servicing to avoid drift, in view of that these systems are influenced by vibrations in the entire assembly and are new sources of malfunction. The system of the invention further provides good injection control precision over a broad range. In this manner, use of precision valves with high-quality fuel filters for achieving a like performance is avoided. This system may also stabilize RPMs by means of control logic in terrestrial applications for production of electric power.

The systems described hereinabove reduce the wear and increase the useful lifespan of the oil and filters, reducing maintenance service and providing a compact, high-performance and durable turbo-engine having a dynamic response which is not at the expense of the useful lifespan, and a minimum of auxiliary systems and components.

I claim:

1. A turbo-engine comprising:
    a turbine having a high-speed shaft mounted on a first pair of bearing means for delivering rotational mechanical power,
    a low-speed output shaft for delivering useful rotational mechanical power to a load,
    a speed step-down mechanism coupling said shafts to one another in order to transmit such rotational mechanical power from said high-speed turbine shaft to said low-speed output shaft, said step-down mechanism including a high-speed gearwheel, a shaft for said high-speed gearwheel to rotate thereon and a second pair of bearing means for mounting said high-speed gearwheel on said gearwheel shaft to rotate independently of said turbine high speed shaft, and
    a spline coupling said high-speed shaft to said high-speed gearwheel of said speed step-down mechanism,
    wherein said spline is longitudinally traversed by a bore for conveying a mixture of lubricant droplets and air to said high-speed shaft bearings, said droplets assisting in self-balancing said spline and dampening vibrations therein at high shaft speeds.

2. The turbo-engine of claim 1, wherein said bore has a slightly frustoconical shape tapering at an angle of about 1° to the axial direction of said shaft.

3. The turbo-engine of claim 1, wherein said bore has a circumferential cavity about ½ mm deep and in a plane containing the center of gravity said shaft for selfbalancing the shaft spline at high speeds of rotation.

4. A turbo-engine comprising:
a turbine having a high-speed shaft for delivering rotational mechanical power, a low-speed output shaft for delivering useful rotational mechanical power to a load,
a speed step-down mechanism coupling said shafts to one another in order to transmit such rotational mechanical power from said high-speed turbine shaft to said low-speed output shaft and
a spline coupling said speed step-down mechanism to said high-speed shaft;
wherein:
said spline has first and second longitudinally spaced fluting portions and a length between said fluting portions, said spline comprising a substantially rigid member extending throughout said length,
said first fluting portion loosely engaging said high-speed shaft for receiving said rotational mechanical power therefrom,
said second fluting portion loosely engaging said speed step-down mechanism for transmitting said rotational mechanical power thereto,
whereby said fluting portions of said spline form respective engagements which are rigid in the azimutal direction to transmit rotation from said high-speed shaft to said speed step-down mechanism yet loose in the axial and radial directions and allow said first and second fluting portions of said spline to pivot relative to said turbine high-speed shaft and said speed step-down mechanism respectively to substantially decouple axial and radial vibrations therebetween, compensate thermal expansion and tolerate eccentricity in and misalignments between said high-speed shaft, said spline and said speed step-down mechanism.

5. The turbo-engine of claim 4, wherein said spline includes a pair of opposite ends and said fluting portions are substantially on the opposite ends of said spline.

6. The turbo-engine of claim 5, wherein said loosely engaging fluting portions allow each of said first and second spline ends to respectively pivot about a reduced angle on the turbine high-speed shaft or said speed step-down mechanism.

7. The turbo-engine of claim 4, wherein said spline is a removable spline longitudinally traversed by a bore for conducting a mixture including lubricant droplets.

8. The turbo-engine of claim 7, wherein said bore has a circumferential cavity for self-balancing the spline at high speeds of rotation.

9. The turbo-engine of claim 8, wherein said circumferential cavity is in a plane containing the center of gravity said shaft.

10. The turbo-engine of claim 8, wherein said circumferential cavity is about ½ mm deep.

11. The turbo-engine of claim 7, wherein said spline bore has a slightly frustoconical shape for assisting in conducting said mixture therealong at high shaft speeds.

12. The turbo-engine of claim 7, wherein said mixture comprises a pressurized mixture of oil droplets and air.

13. The turbo-engine of claim 4, wherein said step-down mechanism includes:
a high-speed gear wheel coupled to said turbine high-speed shaft and a low-speed gear wheel meshing with said high-speed gear wheel and coupled to said low-speed output shaft; and
wherein said high-speed gear wheel has an axial cavity provided with grooves loosely meshing with said second fluting portion of said spline.

14. The turbo-engine of claim 13, further comprising vibration decoupling means interposed between said low-speed gearwheel and said low-speed output shaft for transmitting rotational power therebetween and dampening transmission of azimutal vibrations on said low-speed output shaft.

15. The turbo-engine of claim 13, wherein said turbine high-speed shaft is mounted on a set of bearings and said high-speed gearwheel is mounted on another set of bearings different from said high-speed shaft bearings.

16. A turbo-engine comprising:
a turbine having a high-speed shaft for delivering rotational mechanical power,
a low-speed output shaft for delivering useful rotational mechanical power to a load,
a speed step-down mechanism coupling said shafts to one another in order to transmit such rotational mechanical power from said high-speed turbine shaft to said low-speed output shaft; and
a spline coupling said speed step-down mechanism to said high-speed shaft;
wherein:
said spline has first and second longitudinally spaced fluting portions and a length between said fluting portions, said spline comprising a substantially rigid member extending throughout said length,
said first fluting portion loosely engaging said high-speed shaft for receiving said rotational mechanical power therefrom,
said second fluting portion loosely engaging said high-speed shaft to said speed step-down mechanism for transmitting said rotational mechanical power thereto,
whereby said fluting portions of said spline form respective engagements which are rigid in the azimutal direction to transmit rotation from said high-speed shaft to said speed step-down mechanism yet loose in the axial and radial directions and allow said first and second fluting portions of said spline to pivot relative to said turbine high-speed shaft or said speed step-down mechanism respectively to substantially decouple axial and radial vibrations therebetween, compensate thermal expansion and tolerate eccentricity in and misalignments between said high-speed shaft, said rigid spline member and said speed step-down mechanism;
wherein said step-down mechanism includes a high-speed gear wheel coupled to said turbine high-speed shaft and a low-speed gear wheel meshing with said high-speed gear wheel and coupled to said low-speed output shaft; and
wherein said high-speed gear wheel has an axial cavity provided with grooves loosely meshing with said second fluting portion of said spline;
said turbo-engine further comprising vibration decoupling means interposed between said low-speed gearwheel and said low-speed output shaft for transmitting rotational power therebetween and dampening transmission of azimutal vibrations on said low-speed output shaft, said vibration decoupling means including:

a disk secured to the low-speed shaft and having a metal contact surface, and resilient bushing means coupling said metal contact surface of the low-speed gear to said metal contact surface of the low-speed shaft, thereby dampening transmission of vibrations between said metal contact surfaces.

17. The turbo-engine of claim 16, wherein said low-speed gearwheel and said low-speed shaft disk each have facing rigid contact surfaces provided with aligned orifices and rotationally connected by said bushing means, said bushing means comprising bolt means sheathed in resilient material passing through said orifices and resilient washer means between said rigid contact surfaces.

18. The turbo-engine of claim 17, wherein both said rigid contact surfaces are metallic.

* * * * *